United States Patent [19]

Fisher

[11] Patent Number: 5,140,559
[45] Date of Patent: Aug. 18, 1992

[54] LOW FLOW-NOISE CONFORMAL FIBER OPTIC HYDROPHONE

[75] Inventor: Stanley A. Fisher, Boyds, Md.

[73] Assignee: The United States of America as represented by the Secretary of the Navy, Washington, D.C.

[21] Appl. No.: 658,496

[22] Filed: Feb. 21, 1991

[51] Int. Cl.$^5$ .............................................. G01B 9/02
[52] U.S. Cl. ................................. 367/149; 250/227.14; 250/227.19; 356/345
[58] Field of Search ............... 367/149; 250/227.14, 250/227.28, 227.19; 356/345, 357; 350/96.29

[56] References Cited

U.S. PATENT DOCUMENTS

| | | | |
|---|---|---|---|
| 4,162,397 | 7/1979 | Bucaro et al. | 250/199 |
| 4,166,932 | 9/1979 | Selway | 179/121 R |
| 4,297,887 | 11/1981 | Bucaro | 73/655 |
| 4,300,727 | 11/1981 | Koch et al. | 242/2 |
| 4,363,114 | 12/1982 | Bucaro et al. | 367/149 |
| 4,446,543 | 5/1984 | McLandrich et al. | 367/149 |
| 4,449,210 | 5/1984 | Myer | 367/149 |
| 4,527,749 | 7/1985 | Matthews et al. | 242/7.15 |
| 4,624,570 | 11/1986 | Bertollini | 356/373 |
| 4,649,529 | 3/1987 | Avicola | 367/149 |
| 4,994,668 | 2/1991 | Lagakos et al. | 250/227.19 |

Primary Examiner—J. Woodrow Eldred
Attorney, Agent, or Firm—Gary G. Borda; Howard Kaiser; Luther A. Marsh

[57] ABSTRACT

A fiber-optic hydrophone having a pair of jacketed fiber optic windings formed in a concentric planar spiral configuration in a layer of polyurethane is provided. One of the fiber optic windings has a fiber with a bonded acoustically sensitive jacket thereby increasing its sensitivity to acoustic energy. The second fiber optic winding, the reference winding, has a unbonded jacket enclosing the fiber resulting in reduced sensitivity to acoustic energy. Sensitivity to vibrational energy; however, is not reduced. The combining of signals from the pair of fibers provides a vibration-canceled acoustic signal.

12 Claims, 2 Drawing Sheets

LOW FLOW-NOISE CONFORMAL FIBER OPTIC HYDROPHONE

ORIGIN OF THE INVENTION

The invention described herein was made in the performance of official duties by employees of the Department of the Navy and may be manufactured, used, or licensed by or for the Government, for any governmental purpose without payment of fees or any royalties thereon.

BACKGROUND OF THE INVENTION

1. Technical Field of the Invention

The invention relates generally to acoustic sensors and more particularly to fiber optic acoustic sensors.

2. Prior Art

The use of laser interferometers for detection of acoustic signals is known. Typical prior art devices have been configured by winding an optical fiber onto a pressure sensitive mandrill or by suspending a pressure sensitive fiber in an acoustic medium, typically in a spiral configuration.

The limitations of the prior art devices include the requirement of suspending the array in a manner that does not restrict the acoustic response. This requirement greatly complicates suspension. Further, prior sensors are typically configured three-dimensionally, thereby further increasing suspension difficulties and limiting their use in moving flow fields. In the low wave number domain experienced by hull structures, pressure fluctuations in the turbulent boundary layer induce vibration in the hull structure resulting in vibrational noise. Prior sensors are sensitive to vibration induced noise and are therefore limited in overall sensitivity to acoustic energy signals due to the necessity of suppressing vibrational noise. Acoustic sensors used to quantify low wave number pressure components in a turbulent boundary have lacked sufficient sensitivity because of this required suppression of noise vibration induced. This lack of sensitivity is critical because the wavenumber characteristics of the turbulent boundary layer pressure fluctuations have large values at the structural wavenumber response of the hull of underwater vehicle. The hull structure in these circumstances is excited by the boundary layer pressure fluctuations and the resulting vibrations become a significant noise source. The vibration induced noise and impinging acoustic signals are in the same frequency range and therefore cannot be filtered by conventional means. Therefore, the presence of vibrational noise greatly reduces the effectiveness of prior hydrophone sensors in detecting and isolating acoustic energy signals from the acoustic medium.

SUMMARY OF THE INVENTION

It is therefore an object of the invention to provide a fiber optic hydrophone having improved sensitivity to acoustic signals.

It is a further object of the invention to provide a fiber optic hydrophone having a reduced sensitivity to vibrational noise and in particular to flow noise.

It is yet another object of the invention to provide a fiber optic hydrophone having a planar configuration.

It is still a further object of the invention to provide a fiber optic hydrophone having an acoustically-transparent structure.

It is a further object of the invention to provide a fiber optic hydrophone having a compliant material which may be molded to a ship hull or other structure.

The invention is a fiber optic hydrophone having a pair of optical fibers each having acoustically sensitive jackets and wound in a planar coil embedded in a compliant sheet of acoustically transparent material. The windings form a single planar disk in which one of the optical fibers, the sensing fiber, is continuously bonded to its protective jacket while the other fiber, the reference fiber is enclosed within, but not bonded to, its protective jacket. The unbonded fiber is less sensitive to acoustic signals from the acoustic medium but remains sensitive to vibration induced medium. The entire assembly is further encapsulated in a polyurethane layer forming a large pancake sensor which may be molded to a ship hull or other shape as required.

The resulting hydrophone detects acoustic energy by use of an electronic unit which detects the phase difference between the two optic fibers. Phase shifts caused by vibrations however, are not detected as each fiber is equally affected and there is no phase difference. This arrangement effectively cancels vibrational noise.

BRIEF DESCRIPTION OF THE DRAWINGS

The foregoing objects and other advantages of the invention will be better understood from the following description taken with the accompanying drawings wherein like reference numerals refer to the same element throughout and wherein.

DETAILED DESCRIPTION OF THE INVENTION

Figure 1:
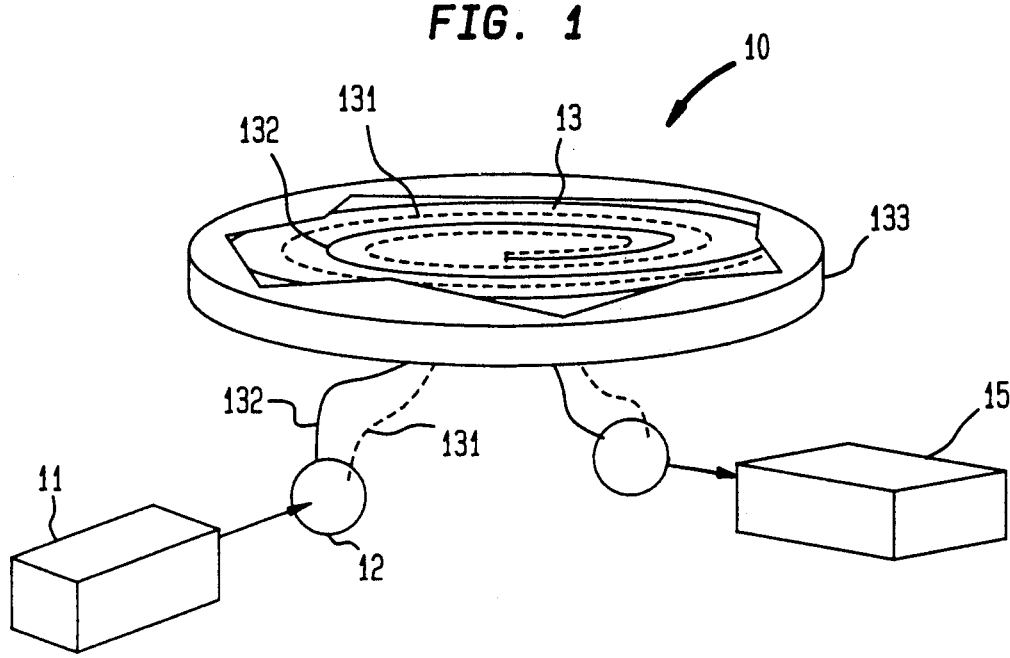
FIG. 1 is a perspective view of the fiber-optic hydrophone with a partial cutaway of the acoustic sensor.

Referring now to FIG. 1, the hydrophone of the present invention, designated generally by the reference numeral 10, is shown with its major components. These components include a laser source 11, a fiber-optic sensor assembly 13, and an opto-electronic unit 15. Laser source 11 may be any available source providing coherent light. In the preferred embodiment, a laser emitting at a wavelength of 800 nM was used. A second embodiment used a laser emitting at a wavelength of 1300 nM was used.

The heart of the invention lies in the planar fiber optic sensor assembly 13. Energy going to the planar fiber optic sensor from a laser light source 11 is split into two parts by splitter 12, one part travelling through sensing loop 131 and a second part traveling through reference loop 132. Sensing loop 131 is formed in a spiral configuration encased in an elastomer material 133. The preferred elastomer material is polyurethane. However, any compliant and acoustically transparent material may be used. Reference loop 132 is also formed in a spiral configuration in the same elastomer material and is further arranged in concentric pattern with the sensing loops. This pattern allows the reference loop to be located adjacent to the sensing loop at all points along the spirals. By locating the loops in concentric spirals, vibrational inputs caused by vibration of the structure upon which the planar fiber optic sensor is mounted are sensed by both the sensing loop 131 and the reference loop 132 equally. Effectively, both loops lie in approximately the same physical locations and therefore both are subject to the same vibrational inputs.

Figure 2:
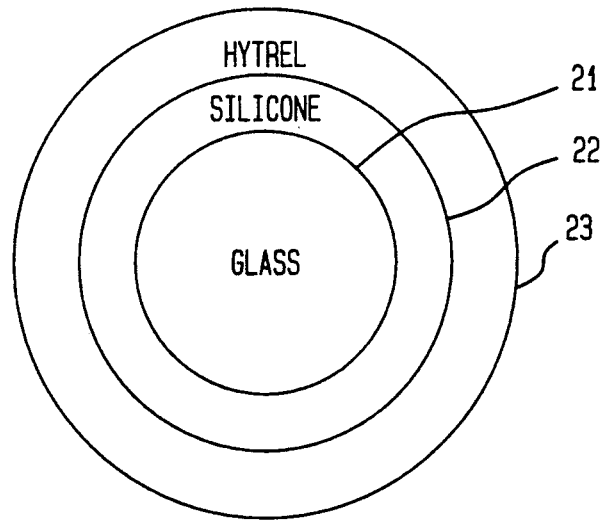
FIG. 2 is a diagram depicting the operation of the present invention.

Referring now to FIG. 2, a cross-section of sensing loop 131 is shown depicting the component layers. The center portion is the glass/silicone optical fiber 21. A bonding agent 22, is applied between the optical fiber and the acoustically sensitive jacket 23. The preferred jacket material is Hytrel. The result of this bonding is that the sensing arm is made highly sensitive to acoustic energy, while the reference arm, without bonding between the jacket and the optical fiber, is far less sensitive to acoustic and therefore, insulated from impinging energy. This is an important feature because the vibrational and acoustic signals are in the same frequency range and therefore cannot be filtered by conventional means.

It is well known that the shape of acoustically sensitive materials is altered by pressure fluctuations induced by impinging acoustic energy. When the acoustically sensitive jacket is bonded to the fiber of sensing loop 131, the shape change is more fully transferred to the underlying fiber and, thus, the acoustically sensitive fiber changes shape under pressure. The change in the strain within the glass core causes changes in the index of refraction of the glass core and the length of the fiber, resulting in a difference in optical path length (or phase) between light travelling through the two loops. The unbonded jacket of reference loop 132 does not effectively transmit the acoustic energy to the acoustically sensitive fiber of the reference loop. However, both the sensing and the reference loops are equally affected by vibrational input and, therefore, the light traveling through the two loops experiences identical phase shifts due to vibration. The phase difference of the light traveling through the two loops, is therefore, directly related to the acoustic energy level. Signals from the two loops are then recombined, obtaining a phase modulated signal through the Doppler effect. The electro-optic unit 15 in the preferred embodiment was designed by the Naval Research Laboratory and fabricated by Optech, Inc. using a synthetic heterodyne demodulation technique for interrogating the phase modulated signal. The unit comprises an optical phase detector, photovoltage converter and a pre-amplifier.

Figure 3:
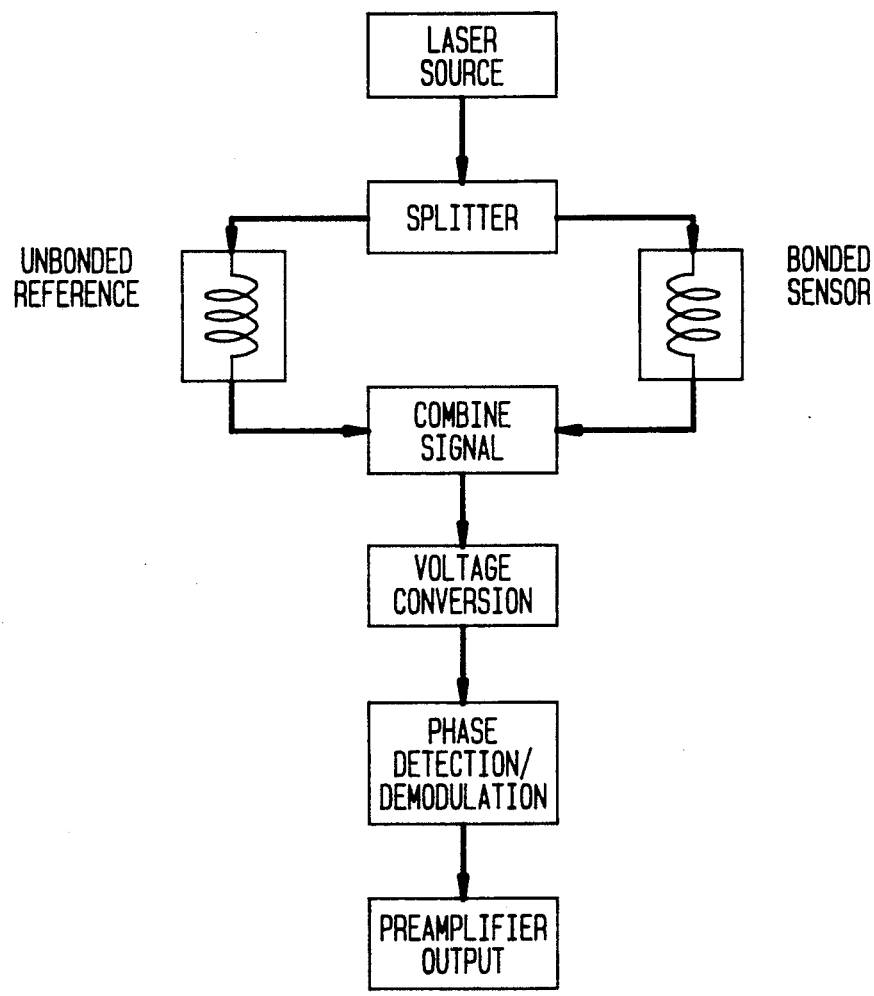
FIG. 3 is a block diagram showing the functional components of the present invention.

Operation of the hydrophone may be seen by reference to FIG. 3, wherein a block diagram depicts the functional components of the hydrophone. The laser source provides a coherent light signal to a splitter which sends part of the signal to the bonded sensor loops and part to the unbonded reference loop. The output signal is recombined, the phase shift between the loops is detected, thus isolating the acoustic signals from the vibration noise. The signal is further processed to provide a voltage conversion which is proportional to real time acoustic pressure at the sensor. These signals can be used either independently or in acoustic arrays.

The advantages of the present invention are numerous. The planar hydrophone provides a compliant disk which can be formed to fit the shape of a ship's hull or any other desired geometric shape. The acoustically transparent elastomer which encapsulates the array of fiber optic windings protects the array and allows direct attachment to the hull without reducing acoustic sensitivity.

Also the acoustically transparent elastomer permits layering of multiple hydrophones. This feature permits installation the present invention over a conventional hydrophone or sonar array. Alternatively, multiple planar fiber optic hydrophones may be installed in layers. This layering is useful for spatial filtering or array-like beamforming, or simply redundancy to improve reliability.

Additionally, the hydrophone provides a unique structure in that the sensing and reference loops are everywhere collocated by use of the concentric spiral windings. The collocating of fiber optic loops and the bonded and unbonded jackets on the fiber optics provide a unique result. Because both sensing and reference loops are encased concentrically within the same elastomer material, both receive identical vibrational inputs, but only the sensing loop only is affected by acoustic signals. The detection process only measures phase differences, thus effectively cancelling any vibration-induced signals. The result occurs even though the vibration and acoustic inputs are in the same frequency range.

Although the invention has been described relative to a specific embodiment thereof, there are numerous variations and modifications that will be readily apparent to those skilled in the art in the light of the above teachings. It is therefore to be understood that, within the scope of the appended claims, the invention may be practiced other than as specifically described.

What is claimed as new and desired to be secured by Letters Patent of the United States is:

1. A vibration-canceling fiber optic hydrophone comprising:
   a. a sensing coil formed with an optical fiber having a jacket which is acoustically sensitive bonded to the optical fiber;
   b. a reference coil formed with an optical fiber having a protective jacket that is not bonded to the optical fiber;
   c. a planar acoustic sensing disk formed by forming said sensing coil and reference coil into a planar concentric spiral;
   d. an acoustically transparent material encapsulating said planar acoustic sensing disk thereby forming a sealed, compliant planar layer;
   e. a coherent light source connected to and transmitting light to said reference optical fiber and to said sensing optical fiber; and
   f. an opto-electronic unit connected to and receiving transmitted light from said reference and sensing optical fibers suitable for determining phase shift differences between said sensing and reference optical fibers.

2. A vibration-canceling fiber optic hydrophone comprising:
   a. means for providing coherent light;
   b. means for receiving coherent light, said receiving means having optical characteristics which vary when subjected to acoustic impingement;
   c. means for detecting vibration signals, said detecting means being insulated from acoustic impingement;
   d. means for processing output signals from said receiving means and said detecting means; and
   e. means for demodulating processed output signals to obtain a low vibration noise acoustic signal.

3. A vibration-canceling fiber optic hydrophone as in claim 2 wherein said means for providing coherent light is a laser light source.

4. A vibration-canceling fiber optic hydrophone as in claim 3 wherein said laser light source emits light at a wavelength of 800 nM.

5. A vibration-canceling fiber optic hydrophone as in claim 3 wherein said laser light source emits light at a wavelength of 1300 nM.

6. A vibration-canceling fiber optic hydrophone as in claim 2 wherein said means for receiving coherent light is a fiber optic coil having an acoustically sensitive jacket continuously bonded to the fiber optic coil and wound on a compliant sheet of acoustically transparent material.

7. A vibration-canceling fiber optic hydrophone as in claim 6 wherein said acoustically transparent material is polyurethane.

8. A vibration-canceling fiber optic hydrophone as in claim 2 wherein said means for detecting vibration signals comprises a fiber optic coil having a jacket that is not bonded to the fiber optic coil and wound on a compliant sheet of acoustically transparent material.

9. A vibration-canceling fiber optic hydrophone as in claim 8 wherein said acoustically transparent material is polyurethane.

10. A vibration-canceling fiber optic hydrophone as in claim 2 wherein said means for receiving coherent light and said means for detecting vibration signals each comprise a fiber optic coil with the coils collocated on a compliant; sheet and form concentric windings.

11. A vibration-canceling fiber optic hydrophone as in claim 2 wherein said means for processing output signals is an optical-electronic processor having an optical phase detector, photo-voltage converter, and pre-amplifier.

12. A vibration-canceling fiber optic hydrophone as in claim 2 wherein said means for demodulating is a device using synthetic heterodyne demodulation.

* * * * *